3,194,731
**METHOD FOR HYPNOSIS AND TRANQUILIZA-
TION WITH PIPERAZINEDIONE DERIVATIVES**
Sidney Robert Safir, River Edge, N.J., assignor to American Cyanamid Company, Stamford, Conn., a corporation of Maine
No Drawing. Filed Mar. 11, 1963, Ser. No. 264,035
3 Claims. (Cl. 167—52)

This invention relates to a dosage unit form of certain piperazinediones. More particularly, it relates to methods and compositions useful as hypnotics in warm blooded animals.

In the past, compounds having hypnotic activity have been utilized to depress sensory and mental processes, to lower perception of external stimuli for the purpose of inducing sleep. Many such hypnotics, however, produce generalized central nervous system depressant effects along with their hypnotic and muscle relaxant effects. Other hypnotics are effective only for short periods when administered in small doses but progress quickly to producing stupor or eventual coma with increasing doses. When such hypnotics are used in sufficient doses to induce sleep, they often make for difficulty of arousal and produce in the user unpleasant feelings of hangover the next morning. Also, some of the hypnotics used in the past have a tendency to cause undesirable side effects such as an initial mood of agitation or excitement, bad taste, irritation of the gastrointestinal tract, kidney damage, blood dyscrasias, cardiac and resporatory depression and even drug tolerance which may end in physical dependence or other pathologies due to cumulative effects.

We have now found that 3-phenyl-3-methyl-2,6-piperazinedione and 3-phenyl-3-propyl-2,6-piperazinedione produce hypnosis and have tranquilizer and muscle relaxant properties without the usual side effects. The compounds of this invention are, in general, white crystalline solids relatively insoluble in water but soluble in lower alkanols, acetone, lower alkoxyalkanols and the like. These compounds, as active ingredients of compositions, have been found to be highly desirable as hypnotics, tranquilizing agents and muscle relaxants. The compositions containing the active compounds of the present invention are relatively free of generalized central nervous system depressant effects. Thus, the compositions are free of side effects of many hypnotics used in the past such as barbiturates, chloral hydrate and the like. The compositions are effective in inducing a prompt sense of relaxation followed by sleep from which arousal to full awareness is accomplished without indication of intoxication or torpor.

The compositions of the present invention containing as active ingredients 3-phenyl-3-methyl-2,6-piperazinedione or 3-phenyl-3-propyl-2,6-piperazinedione have been found useful when the active component is present in from 100 mg. to 2000 mg. per dosage unit. The amount of drug to be taken is obviously dependent upon the results which are sought by the user, smaller doses being sufficient as mild tranquilizer or muscle relaxant and larger doses when hypnotic action is desired.

The usual criterion of hypnotic effect of a drug experimentally administered to mice, for example, is the inability of test animals to right themselves spontaneously after being placed on their backs or sides for at least five minutes. Normal or control mice perform the righting action immediately. The disability is termed "loss of righting reflex" and is attributed to the depressant effect of the drug on the central nervous system. Most commercially available hypnotic drugs produce the disability at oral dose levels of less than 600 mg./kg. of body weight.

The compound, 3-n-propyl-3-phenyl-2,6-piperazinedione, one of the active components of the compositions of the present invention, causes loss of righting reflex in 50% of the test animals ($HD_{50}$) at an oral dose of 204 mg./kg. of body weight. The dose of the same compound causing death of 50% of the test animals ($LD_{50}$) is 1000 mg./kg. of body weight. The wide range between effective hypnotic and lethal doses is highly desirable and obviously advantageous over that of phenobarbital, a commercial hypnotic, for which the same defined doses are 159 and 255 mg./kg. of body weight. Comparable values for the other active component of the present compositions, namely, 3-phenyl-3-methyl-2,6-piperazinedione are 320 and 820 mg./kg. of body weight.

A scientific accepted measure of tranquilizing action in a drug is reduction of spontaneous motor activity in mice to which the drug has been administered. 3-methyl-3-phenyl-2,6-piperazinedione is more effective in this respect than meprobamate (a recognized tranquilizer). Phenobarbital, a recognized hypnotic, does not show tranquilizing action by this test.

The activity of the compositions of the present invention in mice is indicative of activity as hypnotics, tranquilizers and muscle relaxants in other warm blooded animals.

The active piperazinediones of the present invention may be administered in compositions such as tablets which may contain the usual corn starch, magnesium stearate, alginic acid salts and so forth, well known in the compounding arts. The tablets may be of larger sizes, scored for use as fractional units, one or more times per day.

The new compositions may be dispensed in the form of soft or hard gelatin capsules. Also present in the capsules may be diluents such as lactose, starch, magnesium oxide, magnesium stearate and the like. The capsules may be large enough to provide a daily dosage or smaller to be used in multiple doses per day.

The present compositions may be dispensed in the form of wafers which may contain one or more of the following: mannitol, saccharin sodium, sucaryl, magnesium stearate, talc or the like. As in the case of tablets, the wafers may be scored for use as a whole in daily doses or fractional units one or more times per day.

The compositions of the present invention may also take the form of syrups or pediatric drops. Such formulations usually contain one or more of the following suspending agents, buffer salts, stabilizers, preservatives and so forth.

The compositions of the present invention can also be dispensed as solutions or suspensions and as such may include one or more of the following surfactants such as Tween 80, polyoxyethylene-20-sorbitan monooleate, polyoxyethylene-20-stearate; and a suspending agent such as Carbowax 4000, polyethylene glycol 4000, methyl cellulose or carboxymethyl cellulose. Solutions or suspensions usually include a stabilizer such as sodium sulfite, sodium sequestrene or monothioglycerol and a preservative such as benzyl alcohol parabens (methyl and propyl esters of p-hydroxy benzoic acid) or the like.

The examples hereinafter describe the preparation of the active components of the dosage unit compositions and also a number of formulations of representative pharmaceutical types.

*Example I.—Preparation of 3-methyl-3-phenyl-2,6-piperazinedione*

A mixture of 36 g. (0.3 mole) of acetophenone, 55.8 g. (0.4 mole) of ethyl glycinate hydrochloride, 31.2 g. (0.48 mole) of potassium cyanide, 60 ml. of water and 180 ml. of ethanol is placed in one liter flask. The flask is sealed with a stopper, in which a thermometer has been inserted and heated at 60–65° C. for five hours. The reaction mixture becomes homogeneous and dark brown in color during the heating process. The reaction mixture is allowed to cool to room temperature. On cooling, a dark brown solid precipitates. The reaction mixture is filtered and the filter cake is extracted three times with ether and three times with ethanol at which time the extracts are colorless. The aqueous alcohol filtrate and the ether and ethanol extracts are combined and evaporated under reduced pressure to give a dark brown solid residue. The solid residue is extracted with ether until a colorless solution is obtained. The ether extracts are combined, washed twice with 100 ml. portions of 5% hydrochloric acid, and dried over magnesium sulfate. The ethereal solution is treated with hydrogen chloride to pH 1, whereupon an amber oil separates. On cooling the oil does not crystallize. The ether is decanted and the oil is taken up in chloroform. The chloroform solution is dried, decolorized and evaporated under reduced pressure to give 29 g. of a yellow semi-solid. This material is used without further purification in the following reaction.

A mixture of 10 g. (0.037 mole) of N-(α-cyano-α-methylbenzyl)glycine ethyl ester hydrochloride (obtained immediately above) and 160 g. of polyphosphoric acid are heated at 90°±5° for five hours with stirring. The reaction mixture is poured slowly with vigorous stirring over flaked ice, while maintaining a temperature below 25° C. The aqueous solution is then neutralized by very slow addition of 250 ml. of concentrated ammonium hydroxide at a temperature below 30° C. The neutral solution is extracted three times with 100 ml. portions of chloroform. The chloroform extracts are dried, decolorized and evaporated under reduced pressure to give an amber oil which solidifies on cooling and scratching. One recrystallization from chloroform-petroleum ether and one recrystallization from 5% aqueous ethanol gives a white solid, 3-methyl-3-phenyl-2,6-piperazinedione, melting point 133–133.5° C.

*Example II.—Preparation of 3-n-propyl-3-phenyl-2,6-piperazinedione*

The following: 84.5 g. (1.58 moles) ammonium chloride, 190 ml. (2.86 moles) concentrated ammonium hydroxide, 214 ml. (211.5 g., 1.43 moles) n-butyrophenone, 430 ml. ethanol, 93.0 g. (1.43 moles) potassium cyanide and 350 ml. water are mixed in a reaction flask in the above order. The flask is sealed, stirred at room temperature for about one hour, and then at 60–65° C. for about 18–20 hours. The reaction mixture is cooled to below 20° C., the flask opened and the mixture filtered through diatomaceous earth. The cake is washed with 3 x 100 ml. portions of ethanol. The combined filtrate and washes are concentrated at reduced pressure (water aspirator) on a steam bath to an oily solid residue. One liter of benzene is added to the residue and the mixture again concentrated to an oily solid residue. The residue is treated with 1.5 liters of benzene, 20 g. of activated charcoal, stirred at room temperature for about one-half hour and filtered through diatomaceous earth. The cake is washed with 4 x 50 ml. portions of benzene. The filtrate and washes are combined and concentrated on a stream bath at atmospheric pressure until the vapor temperature reached 81° C. and the distillate comes over clear (about 1.0 liter of benzene has distilled). The residue is treated with 500 ml. of benzene and an additional 200–250 ml. of benzene removed by distillation. The residue is dried for one hour over magnesium sulfate and activated charcoal, filtered through diatomaceous earth and the cake washed with 3 x 50 ml. portions of benzene. The combined filtrate and washes are cooled in an ice-water bath and treated with anhydrous hydrogen chloride for about one-half hour. A light tan colored solid precipitates with 4–5 minutes. The crude product is collected by filtration. The cake is slurried in 1.5 liters of reagent diethyl-ether and the slurry filtered. The product is washed on the filter with 3 x 100 ml. portions of ether. After air drying overnight, 96.0 g. of product, 2-amino-2-phenylvaleronitrile hydrochloride (melting point 124–126.5° C. with decomposition), is used in the next step.

Four hundred ml. concentrated sulfuric acid (sp. gr. 1.84, assay, 96.3%) is charged to a 2 liter 3-necked, round-bottomed flask fitted with a mechanical stirrer, thermometer and air condenser (with Drierite drying tube). The 2-amino-2-phenylvaleronitrile hydrochloride is added in portions over a 5–10 minute period. A heavy evolution of hydrogen chloride occurred immediately and a complete solution is obtained within 10–15 minutes after the addition of the nitrile is complete. The dark solution is stirred at room temperature overnight. Crushed ice (800 g.) is placed in a 3 liter 3-necked, round-bottomed flask fitted with a mechanical stirrer and cooled in an ice-acetone bath. The reaction solution immediately above is added slowly to the ice. After the addition is complete, 28% aqueous ammonia is added until a pH of 8–9 is obtained. The temperature is maintained below 30° C. during the neutralization. The tan granular solid which precipitated is collected by filtration and washed with three 200 ml. portions of water. The damp cake is slurried in 500 ml. of water and enough glacial acetic acid (150 ml.) is added to give a dark hazy solution which is decolorized with 15 g. of activated charcoal. The mixture is filtered through a pad of diatomaceous earth and the cake washed with three 100 ml. portions of water. The filtrate and washes are combined, chilled in an ice-acetone bath and adjusted to pH 8+ with 28% aqueous ammonia. The product precipitates as a white granular solid, is collected by filtration, washed with three 150 ml. portions of water and air dried to constant weight. This material is reprecipitated again and there is obtained 135 g. (98.0) of product, 2-amino-2-phenylvaleramide, which melts at 111.5–112.0° C.

A solution of 38.5 g. (0.200 mole) 2-amino-2-phenylvaleramide and 18.4 g. (0.200 mole) glyoxylic acid monohydrate in 500 ml. ethanol is placed in a 2 liter three necked, round-bottomed flask fitted with a mechanical stirrer, thermometer and reflux condenser. To this solution 8.30 g. (0.220 mole) sodium borohydride is added in portions over a half-hour period; vigorous reaction occurred after each addition and the temperature rises from 25° to 50° C. (no cooling bath is used). After addition is completed, the slightly hazy solution is heated under refluxing conditions for four hours. This reaction mixture is cooled slightly, decolorized with 5 g. of activated charcoal, filtered through diatomaceous earth and the cake washed with three 50 ml. of ethanol. The combined filtrate and washes are chilled in an ice ethanol bath and the solution is saturated with anhydrous hydrogen chloride; a white solid (A) precipitates almost immediately and is collected and washed with acetone. Filtrate and wash are combined and concentrated at atmospheric pressure to a thick slurry which is filtered and the white filter cake (B) is washed with acetone. (A) and (B) are combined: weight is 36.0 g. (62.8%), of 2-carboxymethylamino-2-phenylvaleramide hydrochloride, melting point 135–143° C. The 36.0 g. (0.125 mole) of 2-carboxymethylamino - 2 - phenylvaleramide hydrochloride is slurried with 400 g. of polyphosphoric acid at 30° C. for one day. The mixture is poured onto ice and worked up as described in Example 1. The product obtained is 3-phenyl-3-n-propyl-2,6-piperazinedione, melting point 75.5 to 77.0° C.

*Example III.—Tablets*

| | |
|---|---|
| 3-phenyl-3-methyl-2,6-piperazinedione _____g__ | 40 |
| Corn starch _____g__ | 4 |
| Alginic acid _____g__ | 4 |
| Methyl cellulose 400 cps. (or ethyl cellulose N 10) _____g__ | 0.5 |
| Magnesium stearate (1%) _____g__ | 4 |

The above is thoroughly mixed and punched into 100 tablets giving 400 mg. of drug per tablet.

Example IV.—Wafers

| | |
|---|---|
| 3-phenyl-3-methyl-2,6-piperazinedione _____g__ | 50 |
| Mannitol _____g__ | 50 |
| Saccharin sodium _____g__ | 100 |
| Sucaryl sodium _____g__ | 1100 |
| Flavor _____g__ | 1.5 |
| Magnesium stearate (1.5%) _____g__ | 1.5 |
| Talc (1.5%) _____g__ | 1.5 |

The above formulation is made into 50 wafers giving 1000 mg. of drug per wafer.

Example V.—Capsules

| | |
|---|---|
| 3-phenyl-3-propyl-2,6-piperazinedione _____g__ | 30.0 |
| Magnesium stearate _____g__ | 1.5 |
| Lactose, U.S.P. _____g__ | 22.5 |

The above formulation is placed in 100 capsules giving 300 mg. of drug per capsule.

I claim:

1. A method of inducing hypnosis and tranquilization which comprises orally administering to warm-blooded animals from 100 to 2000 milligrams of a compound selected from the group consisting of 3-phenyl-3-methyl-2,6-piperazinedione and 3-phenyl-3-propyl-2,6-piperazinedione in dosage unit form and a pharmaceutical carrier.

2. A method of inducing hypnosis and tranquilization which comprises orally administering to warm-blooded animals from 100 to 2000 milligrams of 3-phenyl-3-methyl-2,6-piperazinedione in dosage unit form and a pharmaceutical carrier.

3. A method of inducing hypnosis and tranquilization which comprises orally administering to warm-blooded animals from 100 to 2000 milligrams of 3-phenyl-3-propyl-2,6-piperazinedione in dosage unit form and a pharmaceutical carrier.

References Cited by the Examiner

UNITED STATES PATENTS

| | | | |
|---|---|---|---|
| 2,750,383 | 6/56 | Safir | 260—268 |
| 2,973,365 | 2/61 | Jansen | 260—297 |
| 2,999,880 | 9/61 | Wheatley | 260—559 |

FOREIGN PATENTS

| | | |
|---|---|---|
| 779,317 | 7/57 | Great Britain. |

OTHER REFERENCES

Hollister, Annals of Int. Med., vol. 51, No. 5, pp. 1032–1033, Nov. 1959.

Seevers, Univ. of Mich. Med. Bull., Sept. 1957, pp. 338–339.

JULIAN S. LEVITT, *Primary Examiner.*

FRANK CACCIAPAGLIA, Jr., *Examiner.*